United States Patent Office 3,816,532
Patented June 11, 1974

3,816,532
KETOXIME CARBAMATE PESTICIDES
Frank Muller, Evenhausen, near Wasserburg am Inn,
Werner Lohringer, Munich, Karl Milles, Holzkirchen,
and Hermann Braunling and Helmut Prigge, Munich,
Germany, assignors to Consortium für Elektrochemische Industrie GmbH, Munich, Germany
No Drawing. Filed July 15, 1971, Ser. No. 163,072
Claims priority, application Germany, July 23, 1970,
P 20 36 491.4
Int. Cl. C07c *131/00*
U.S. Cl. 260—566 AC          2 Claims

ABSTRACT OF THE DISCLOSURE

Pesticides having a content of one or several ketoxime carbamates of the general formula

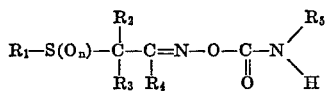

where $R_1$ is methyl or ethyl, $R_2$ and $R_3$ hydrogen, methyl or ethyl, $R_4$ methyl or ethyl, $R_3$ and $R_4$ can be connected together to form a ring with 12 carbon atoms at the most, preferably up to 6, $R_5$ is hydrogen, methyl or ethyl, and $n=0$, 1 or 2.

---

In patent #3,217,037 the general formula

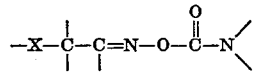

in which X represents oxygen or sulphur in their various oxidation stages and the free valences are saturated by oxygen and hydrocarbon radicals, describes aldoxime carbamates as pesticides. Although these O-carbamyloximes of α-substituted aldehydes are good pesticides, they have a high toxicity on warm-blooded animals. The only compound of this group which attained industrial importance was the aldoxime distributed under the trade name "Temik" (Union Carbide Corporation) with the following formula:

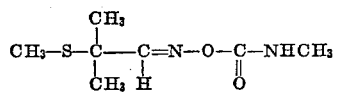

It is a very good insecticide, but the toxicity for warm-blooded animals ($LD_{50}$ oral for rats) is about 0.93 mg./kg. (see Pesticide Manual, May 1968, British Crop Protection Council, page 298). For this reason the use of preparations containing this substance is greatly limited in its application, and its spreading is difficult.

We have now discovered a pesticide having a content of one or several ketoxime carbamates of the general formula

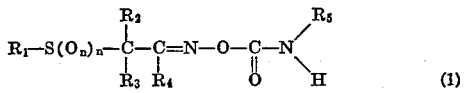

(1)

where $R_1$ is methyl or ethyl, $R_2$ and $R_3$ hydrogen, methyl or ethyl, $R_4$ methyl or ethyl, $R_3$ and $R_4$ may be connected with one another to form a ring with at the most 12, preferably up to 6 carbon atoms, $R_5$ is hydrogen, methyl or ethyl, and $n=0$, 1 or 2.

It is surprising that the compounds of our invention have a warm-blooded animal toxicity which is lower by at least two powers of ten and their pesticide effect is as good as the aldoxime carbamates, although the ketoxime carbamates generally exhibit only a small effect.

If the substituents in the above formula (1) are changed, e.g. by introducing an aromatic residue, by extending the aliphatic residues or by introducing a second substituent on the nitrogen, a marked lowering of the effectiveness against pests takes place, and in many cases it disappears entirely.

Preferably compounds are used where $R_1$, $R_4$ and $R_5$ are methyl in the above formula, $R_2$ and $R_3$ hydrogen or methyl, and $n=0$. These substances exhibit the best pesticide effect.

On the other hand, compounds where $n=1$ or 2, i.e. substances which contain SO or $SO_2$ groups, are water-soluble. Therefore no wetting agent is necessary for the formulation of pesticides. Moreover, such compounds have a low vapor pressure and are therefore particularly suitable for use in closed rooms, e.g. in greenhouses.

Preferred of these water-soluble substances are those where $R_1$, $R_4$ and $R_5$ are methyl, $R_2$ and $R_3$ are hydrogen or methyl and $n$ is 0, 1 or 2.

The pesticides of our invention are primarily suitable as acaricides, nematocides and insecticides. They have a systemic effect and also are contact poisons.

The effective compounds can be produced in analogy with the methods described in patent #3,217,037. Instead of aldoximes only ketoximes are used.

According to one of the production methods described in the aforesaid patent, oximes are converted with isocyanates. If one uses an initial oxime whose melting point is below 100° C. and from which an O-carbamyloxime is formed whose melting point is likewise below 100° C., it is advantageous to perform the conversion without addition of a solvent in the liquid phase at temperatures below 100° C. However, if the melting point of the starting oxime is higher than 100° C., it is preferred to use the O-carbamyl oximes to be manufactured, and to perform the conversion likewise in the liquid phase at temperatures below 100° C. In this manner one obtains high yields and avoids the disadvantages associated with the use of solvents which are alien to the system.

Also, the oximes can be converted with phosgene and subsequently with an amine or with carbamyl chlorides in the presence of acid-bindiny agents. The solvents used for phosgene and carbamyl chloride are inert solvents like benzene, xylene, benzine, ether and tetrahydrofurane.

The oximes used as starting materials can be converted from olefines having non-terminal double bonds, e.g., 2-butene or cyclohexene, and nitrosylchloride into the corresponding dimers, namely 1-nitro-2-chlor compounds, and subsequently they can be transformed by further reaction with alkali or alkaline earth salts of alkylmercaptans with simultaneous regrouping into the corresponding ketoximes.

It is preferred, however, to start with α-halo ketones and to react them with alkylmercaptan salts like for instance alkali or alkaline earth salts, and obtain the oximes by conversion with hydroxylamine. This method is advantageous in that it avoids the necessity of reaction with the hydrolysis-sensitive and poisonous nitrosyl chloride. A further advantage is that the production of oximes is frequently possible without isolation of the intermediate stage and with practically a quantitative yield.

From alkylthioketoxime carbamate produced in this manner one can obtain by oxidation, for instance with hydrogen peroxide, peracetic acid or persulphuric acid in stoichiometric quantities—or the corresponding sulfinyl—or sulfonyl compounds.

The pesticides are produced from the active ingredients in the known manner by mixing and perhaps additional grinding of active substances with fillers, if desired with addition of dispersants and solvents.

In this manner one obtains powders or granulates for spreading with 10 to 80% by weight of active substances, or emulsion concentrates and pastes which can be dispersed in water and/or organic solvents, with 1 to 10% by weight, as well as spraying powders with 5 to 25% effective material. In addition to the active substances described above, one can also add other pesticides like insecticides, nematocides, acaricides, but also fungicides, bactericides and viricides. In addition, plant nutrients can also be admixed with the active substances.

Suitable fillers are, for instance, kaolin, pyrophyllite, kieselguhr, highly dispersed silicic acid, talcum, chalk, suitable carrier granulates are for instance pumice stone, coarse-ground corn, and as binding agents—gypsum semihydrate or magnesium sulfate. In most cases wetting agents are added to the formulations; suitable for this purpose are for instance fatty alcohol sulfonates, arylalkyl sulfonates such as sodium, calcium or magnesium salts of dodecylbenzene sulfonate, arylalkyl glycols, polyethylene glycols, alkylphenoxy polyethoxyethanol, e.g. octylphenoxy polyethoxyethanol.

As solvents for the emulsion concentrates one can use, for instance, diacetone alcohol, ethoxymethanol, butoxyethanol, xylene, toluene or water.

The pesticides are applied by dusting, spreading or spraying as well as by spraying of dispersed or dissolved substances.

The concentration of the active compounds is 0.005 to 80% by weight.

Example 1

(a) *Production of the oxime.* Into a solution of 2 mols NaOH in 310 g. water, 1 mol of methyl mercaptan is piped in gaseous form. After that, under vigorous stirring and external cooling with ice, 1 mol of 2-chlorbutanone-(3) is added drop by drop. The dripping speed is set in such a manner that the temperature remains between 30 and 50° C. After completed addition 1 mol of hydroxylamine hydrochloride is immediately added and stirred for 7 hours at 20° C. After this the aqueous layer is separated. The proton resonance spectrum of the slightly yellowish organic phase shows only 2 isomeric oximes which contain about 4% water. From the integrals of the two characteristic bands for $R_2=H$ and $\delta_{2a}=3.4$ p.p.m. or $\delta_{2\beta}=4.6$ p.p.m. the isomeric proportion of 85:15 is determined. The total yield amounts to 99% of theoretical. After distilling in a vacuum—B.P. 0.05=65° C.—one obtains 97.5% of theoretical 2-thiomethylbutanone-2-oxime. The isomeric proportion remains unchanged at 85:15.

(b) *Conversion of the purified oxime with methylisocyanate.* The oxime from Example 1(a), after addition of 0.05 ml. triethylamine with the molar quantity of methylisocyanate, is stirred and externally cooled with ice to maintain the temperature at 35° C. After letting the mixture stand for 8 hours at room temperature 2-methylthiobutanone-N-methylcarbamyloxime is obtained as a colorless oily liquid. Conversion and yield are quantitative.

(c) *Conversion of the dried raw oxime.* 1 mol of the raw undistilled oxime—obtained as per Example 1(a)—is mixed with 100 ml. benzene and dehydrated by azeotropic distilling. After the residual quantity of the benzene is evaporated in the water jet vacuum, one converts the remaining oxime in the same manner—as already described in Example 1(b)—with methyl isocyanate. One obtains a light brown-colored product. Conversion and yield are practically quantitative. The proton resonance signals are identical with the product under Example 1(b).

Example 2

By analogy to Example 1, the following compounds were produced:

TABLE 1

| No. | $R_1S(O)_n$ | $R_2$ | $R_3$ | $R_4$ | $R_5$ | $\delta_6$ (p.p.m.) | $J_{5,6}$ | B.p. (° C.) |
|---|---|---|---|---|---|---|---|---|
| 1 | $CH_3$—S— | H | $CH_3$ | $CH_3$ | H | 6.55 | | |
| 2 | $CH_3$—S— | H | $CH_3$ | $CH_3$ | $CH_3$ | 6.70 | 4.7 | |
| 3 | $CH_3$—S— | $CH_3$ | $CH_3$ | $CH_3$ | $CH_3$ | 6.60 | 4.7 | 70–75 |
| 4 | $CH_3$—S— | H | H | $CH_3$ | $CH_3$ | 6.76 | 4.8 | 30–42 |
| 5 | $CH_3$—S— | H | $R_3+R_4C_4H_8$ | | $CH_3$ | 6.70 | 4.7 | |
| 6 | $C_2H_5$—S— | H | $CH_3$ | $CH_3$ | $CH_3$ | 6.80 | 4.7 | |
| 9 | $CH_3$—S— | H | $CH_3$ | $CH_3$ | $C_4H_9$ | 6.70 | 6.3 | |
| 10 | $CH_3$—S— | H | $C_2H_5$ | $C_3H_7$ | $CH_3$ | 6.40 | 4.7 | 61 |
| 11 | $CH_3$—S— | H | $CH_3$ | $CH_3$ | $^1(CH_3)_2$ | 3.0 | | |
| 12 | $C_4H_9$—S— | H | $CH_3$ | $CH_3$ | $CH_3$ | 6.80 | 4.5 | |
| 13 | $C_6H_5$—S— | H | $CH_3$ | $CH_3$ | $CH_3$ | 6.70 | 4.7 | |
| 14 | $CH_3$—S— | H | $CH_3$ | $C_6H_5$ | $CH_3$ | | 4.7 | 90–92 |
| 15 | $CH_3$—S— | H | $CH_3$ | $CH_3$ | $C_6H_5$ | 8.16 | | 90–92 |

$^1$ See the following formula:

As a characterization of the compound the chemical displacement in the proton resonance spectrum for the N—H proton on the carbamate group is stated under $\delta_6$ and under $J_{5,6}$ its coupling constant with the $\alpha$-constant protons on $R_5$. For substance No. 15 under $\delta_6$ the position of the —$CH_3$— protons on the carbamate nitrogen is specified. All the spectra were measured in carbon tetrachloride and were gaged on tetramethyl silane as the external standard. For solid substances the melting point was additionally specified.

The substance obtained in accordance with Example 1 is likewise shown in Table 1 as compound 2.

Example 3

1 mol of compound 2 is dissolved in 250 cu. cm. of glacial acetic acid and at 50° C. is slowly compounded with stirring and cooling with 2 mol of a 30% peracetic acid in acetic acid ethyl ester. After evaporating the acetic acid ethyl ester in vacuum the compound 7 is obtained in practically quantitative yield.

Example 4

By analogy to the preceding Example, 1 mol of compound 2 is oxidized with one mol of hydrogen peroxide instead of peracetic acid. Acetic acid used as the solvent. After evaporating the solvent in a vacuum compound 8 is obtained in practically quantitative yield. The other substances can be oxidized in the same manner.

TABLE 2

| No. | $R_1S(O)_n$— | $R_2$ | $R_3$ | $R_4$ | $R_5$ | $\delta_6$ (p.p.m.) | Bp. (° C.) |
|---|---|---|---|---|---|---|---|
| 7 | $CH_3SO_2$ | H | $CH_3$ | $CH_3$ | $CH_3$ | 6.25 | 81–83 |
| 8 | $CH_3SO$ | H | $CH_3$ | $CH_3$ | $CH_3$ | | 124–128 |

Example 5

10% emulsions of the active substances were prepared as follows: 10 g. active substance, 80 g. ethanol, 10 g. arylalkylglycol ether (Triton X155) as emulsifier.

The substances were tested against plant lice and mites. Table 3 shows the compiled test results. The figures indicate the concentration in p.p.m. referred to active compounds which after 7 days still showed a 100% effect.

Moreover, the last column shows the lethal dosage for warm-blooded animals. The commercial product "Temik" (aldoxime carbamate, $R_4$=hydrogen) is included in the table for comparison. It was found that the ketoxime carbamates of the invention have about the same pesticide effect, but the toxicity for warm-blooded animals is lower by 2 to 3 powers of ten.

The systemic effect of the substances was determined in such a manner that the compounds were added to the nutritive solution in which the plants were kept—in the concentrations shown. In order to test the contact effect, the plants were sprayed until dripping wet with a spray liquid which was made by diluting the emulsion concentrated to the values shown in the table.

TABLE 3

| No. | $R_1S(O)_n$ | $R_2$ | $R_3$ | $R_4$ | $R_5$ | Plant concentration, p.p.m. | Lice system, p.p.m. | Spin mites Concentration, p.p.m. | System, p.p.m. | $LD_{50}$ |
|---|---|---|---|---|---|---|---|---|---|---|
| 1 | $CH_3-S-$ | H | $CH_3$ | $CH_3$ | H | 1,000 | 50 | 1,000 | 40 | ------ |
| 2 | $CH_3-S-$ | H | $CH_3$ | $CH_3$ | $CH_3$ | 100 | 5 | 100 | 2 | 153 |
| 3 | $CH_3-S-$ | $CH_3$ | $CH_3$ | $CH_3$ | $CH_3$ | 200 | 10 | 200 | 5 | 379 |
| 4 | $CH_3-S-$ | H | H | $CH_3$ | $CH_3$ | 500 | 10 | 200 | 10 | 665 |
| 5 | $CH_3-S-$ | H | $R_3$ $R_4$ | $C_4H_8$ | $CH_3$ | 200 | 20 | 500 | 40 | ------ |
| 6 | $C_2H_5-S-$ | H | $CH_3$ | $CH_3$ | $CH_3$ | 2,000 | 10 | 500 | 50 | ------ |
| 7 | $CH_3-SO_2-$ | H | $CH_3$ | $CH_3$ | $CH_3$ | 1,000 | 10 | 200 | 5 | 458 |
| 8 | $CH_3-SO-$ | H | $CH_3$ | $CH_3$ | $CH_3$ | 500 | 10 | 200 | 5 | ------ |
| Temik | $CH_3-S$ | $CH_3$ | $CH_3$ | H | $CH_3$ | 100 | 2 | 100 | 5 | 0.93 |

NOTE: "—"=not examined.

Example 6

For comparison, alkyl-thioketoxime carbamates were examined for their pesticide effect, differing only in individual substituents from the compounds claimed herein. It was found that with even such small changes in substituents the effect against plant lice and spin mites is largely dissipated.

TABLE 4

| No. | $R_1S(O)_n$ | $R_2$ | $R_3$ | $R_4$ | $R_5$ | Plant concentration, p.p.m. | Lice system, p.p.m. | Spin mites Concentration, p.p.m. | System, p.p.m. |
|---|---|---|---|---|---|---|---|---|---|
| 9 | $CH_3-S-$ | H | $CH_3$ | $CH_3$ | $C_4H_9$ | 500 | 0 | 0 | 0 |
| 10 | $CH_3-S-$ | H | $C_2H_5$ | $C_3H_7$ | $CH_3$ | 2,000 | 0 | 2,000 | 0 |
| 11 | $CH_3-S-$ | H | $CH_3$ | $CH_3$ | $(CH_3)_2$ | ¹2,000 | 0 | 0 | 0 |
| 12 | $C_4H_9-S-$ | H | $CH_3$ | $CH_3$ | $CH_3$ | 0 | 100 | 0 | 0 |
| 13 | $C_6H_5-S-$ | H | $CH_3$ | $CH_3$ | $CH_3$ | 0 | 0 | 0 | 0 |
| 14 | $CH_3-S-$ | H | $CH_3$ | $C_6H_5$ | $CH_3$ | 0 | 0 | 0 | 0 |
| 15 | $CH_3-S-$ | H | $CH_3$ | $CH_3$ | $C_6H_5$ | 500 | 0 | 0 | 0 |

¹ See the following formula:

NOTE: 0=no effect.

Example 7

A granulate was made in which 10 g. active substance No. 2 was thoroughly mixed with 42 g. pumice granulate 0.5 to 0.8 mm.

38 g. gypsum semihydrate and 10 g. water

A hundred percent kill of plant lice and spin mites was still achieved with a quantity of 0.6 and 0.5 g. active substance per sq. meter.

Example 8

The nematocide effect of the substances was examined in Petri bowls. The concentration of active substances necessary to achieve killing after 24 hours was determined.

TABLE 5

| Compound No. of Table 1: | Concentration which effects killing after 24 hours, percent |
|---|---|
| 2 | 0.05 |
| 3 | 0.2 |
| 4 | 0.3 |
| 5 | 0.2 |
| 6 | 0.3 |

Example 9

In a 2-liter cylindrical glass vessel the following compounds were examined for their effect on corn beetles.

For the examination the substances were spread out evenly on the inside surface of the glass vessel by means of acetone. It was found that with quantities of only 20 mg. per vessel a 100% kill of the corn beetles present could be achieved. Substances 2, 4 and 6 were tested. Examples 10 to 14 show exemplary formulations for various modes of application.

Example 10

Emulsion concentrate:                                        Percent
Effective compounds _____ 10–50
Dodecylbenzene sulfonic acid calcium, sodium
  or magnesium salt _____ 1–3
Alkylphenoxypolyethoxyethanol, e.g. octylphenoxypolyethoxyethanol _____ 0.5–5
Methanol _____ 1.5–3
Solvent: diacetone alcohol, ethoxymethanol or
  butoxyethanol _____ 20–60
Xylene or toluene _____ 20–30

Example 11

Spraying powder:                                             Percent
Effective compounds _____ 10–50
Sodium silicate _____ 0–5
Calcium lignosulfonate _____ 2–5
Wetting agents, e.g. octylphenoxypolyethoxyethanol _____ 0–1
Filler, e.g. kaolin, pyrophyllite or highly dispersed silicic acid _____ 30–90

Example 12

Powders: Percent
- Effective compound _____ 1–10
- Sodium silicate _____ 0–1
- Filler, e.g., highly dispersed silicic acid or talcum _____ 90–99

Example 13

Granulate: Percent
- Effective compound _____ 5–20
- Carrier granulate, e.g. pumice or coarse-ground corn _____ 30–60
- Wetting agent, e.g. octylphenoxypolyethoxyethanol _____ 0–1.5
- Binding agent, e.g. gypsum semihydrate or magnesium sulfate _____ 10–40

Example 14

Percent
- Concentrate for ultra low volume (ULV) application—effective compound _____ 50–90
- Wetting agent, e.g. octylphenoxypolyethoxyethanol _____ 0.5–3
- Wetting agent an the basis of Guanylamine, e.g. VP 122 of the SKW Trostberg _____ 1–5
- Oil, e.g. paraffin oil, peanut oil or a high-boiling mineral oil fraction _____ 5–48

The invention claimed is:

1. A ketoxime carbamate having the formula:

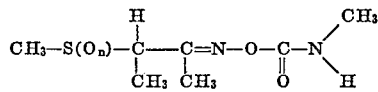

wherein $n$ is 0, 1 or 2.

2. The ketoxime carbamate of claim 1, wherein $n$ is 0.

References Cited

UNITED STATES PATENTS 3,217,037  11/1965  Payne et al. _____ 260—566 AC

BERNARD HELFIN, Primary Examiner

G. A. SCHWARTZ, Assistant Examiner

U.S. Cl. X.R.

424—327